(12) United States Patent
Song et al.

(10) Patent No.: US 8,495,977 B2
(45) Date of Patent: Jul. 30, 2013

(54) INTAKE AND EXHAUST APPARATUS FOR FOUR-STROKE INTERNAL-COMBUSTION ENGINE

(76) Inventors: Kwang Jae Song, Seoul (KR); Se Jin Song, Seoul (KR)

(*) Notice: Subject to any disclaimer, the term of this patent is extended or adjusted under 35 U.S.C. 154(b) by 212 days.

(21) Appl. No.: 12/992,894

(22) PCT Filed: Mar. 9, 2009

(86) PCT No.: PCT/KR2009/001171
§ 371 (c)(1), (2), (4) Date: Nov. 15, 2010

(87) PCT Pub. No.: WO2009/139539
PCT Pub. Date: Nov. 19, 2009

(65) Prior Publication Data
US 2011/0061617 A1    Mar. 17, 2011

(30) Foreign Application Priority Data
May 14, 2008   (KR) .................. 10-2008-0044416

(51) Int. Cl.
*F02B 27/02* (2006.01)
(52) U.S. Cl.
USPC ............. 123/90.27; 123/81 R; 123/190.4; 123/90.23; 123/432; 123/58.9
(58) Field of Classification Search
USPC ............ 123/58.8, 81 R, 81 C, 90.23, 90.27, 123/190.4, 432
See application file for complete search history.

(56) References Cited

U.S. PATENT DOCUMENTS

| | | | |
|---|---|---|---|
| 4,075,986 A | 2/1978 | Keck | |
| 5,016,592 A * | 5/1991 | Onodera | 123/432 |
| 5,682,854 A * | 11/1997 | Ozawa | 123/316 |
| 6,601,379 B1 | 8/2003 | Tomczyk | |
| 6,694,932 B2 * | 2/2004 | Stull | 123/81 D |
| 7,448,350 B2 * | 11/2008 | Luercho | 123/90.11 |
| 7,958,869 B2 * | 6/2011 | Groenendijk et al. | 123/432 |
| 2006/0231049 A1 * | 10/2006 | Luercho | 123/90.11 |

FOREIGN PATENT DOCUMENTS

| | | |
|---|---|---|
| FR | 2764937 | 12/1998 |
| KR | 10-1998-0071928 | 10/1998 |
| KR | 20-1998-0055204 | 10/1998 |
| KR | 20-2001-0002282 | 10/2001 |
| KR | 10-2002-0008555 | 1/2002 |

OTHER PUBLICATIONS

International Search Report for PCT/KR2009/001171 mailed Aug. 18, 2009.

* cited by examiner

*Primary Examiner* — Erick Solis
(74) *Attorney, Agent, or Firm* — Christopher Paul Mitchell

(57) ABSTRACT

The invention comprises a cylinder block wherein vertical reciprocation of a piston is transmitted to a connecting rod that rotates a crank shaft to generate torque. A cylinder head is joined to the top of the cylinder block, whereof one side is connected to a primary intake and exhaust manifold which is opened and shut by a primary intake and exhaust valve and the other side is connected to a secondary intake and exhaust manifold which is opened and shut by a secondary intake and exhaust valve. A primary cam shaft drives the primary intake and exhaust valve. A secondary cam shaft drives the secondary intake and exhaust valve. A tertiary cam shaft is placed on the upper side of the cylinder head and rotates to interlock with the rotation of the secondary cam shaft. Therefore, intake and exhaust performance of a four-stroke internal combustion engine is improved.

20 Claims, 8 Drawing Sheets

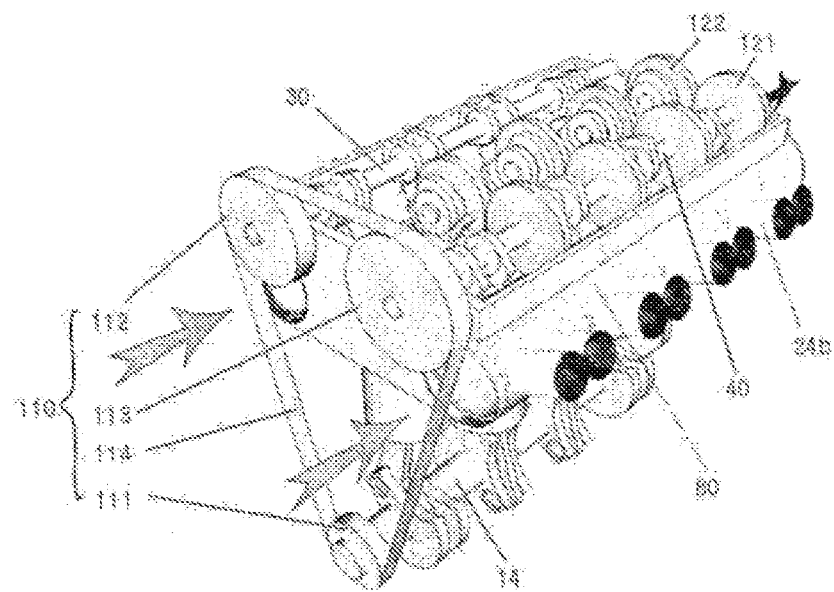

INTAKE AND EXHAUST APPARATUS FOR FOUR-STROKE INTERNAL-COMBUSTION ENGINE

RELATED APPLICATIONS

This application is a 371 application of International Application No. PCT/KR2009/001171, filed Mar. 9, 2009, which in turn claims priority from Korean Patent Application No. 10-2008-0044416, filed May 14, 2008, each of which is incorporated herein by reference in its entirety.

TECHNICAL FIELD

The present invention relates to an intake and exhaust device, and in particular to an intake and exhaust device of a 4-stroke internal combustion engine which can significantly enhance an intake and exhaust efficiency in a 4-stroke internal combustion engine.

BACKGROUND ART

An internal combustion engine generates a driving force by rotating a crank shaft with the aid of a so-called 4-stroke operation which consists of an intake stroke, a compression stroke, an ignition stroke or an explosion stroke determined by means of a fuel spray, and an exhaust stroke by using a mixed fuel or air. The piston descends during the explosion stroke, so the crank shaft connected to a connecting rod rotates by receiving a driving force. The exhaust-intake-compression strokes are consequentially performed as the piston descends by means of an inertia rotation of the crank shaft.

In the conventional art, various methods are proposed in order to more enhance the intake and exhaust efficiencies in such a manner that the diameters of intake and exhaust valves are made larger or the numbers of the same increase.

However, according to the above methods, the mechanism of a 4-stroke internal combustion engine becomes disadvantageously complicated. Since the diameter of a cylinder is generally determined at an initial designing stage, and an intake manifold and an exhaust manifold are separately configured from each other for the exclusive uses of each manifold, there is a limit for increasing the diameters of intake and exhaust valves and the numbers of the same due to the limited sizes of each intake and exhaust port.

Technical Problem

Accordingly, it is an object of the present invention to provide an intake and exhaust efficiency of a 4-stroke internal combustion engine which can enhance an intake and exhaust efficiency of a 4-stroke internal combustion is engine.

Technical Solution

To achieve the above object, there is provided an intake and exhaust device of a 4-stroke internal combustion engine which comprises a cylinder block for generating a rotational driving force in cooperation with the rotation of a crank shaft as an up and down reciprocating movement of a piston is transferred thereto with the aid of a connecting rod; a cylinder head which is engaged to an upper side of the cylinder block, with a first intake manifold opened and closed by means of a first intake and exhaust valve being connected to one side of the cylinder head, with a second intake and exhaust manifold opened and closed by means of a second intake and exhaust valve being connected to the other side of the cylinder head; a first cam shaft which is installed at an upper side of the cylinder head and rotates in cooperation with the rotation of the crank shaft with a first intake and exhaust cam, which drives the first intake and exhaust valve, being engaged to the first cam shaft; a second camp shaft which is installed at an upper side of the cylinder and rotates in cooperation with the rotation of the crank shaft with a second intake and exhaust cam, which drives a second intake and exhaust valve, being engaged to the second cam shaft; a third cam shaft which is installed at an upper side of the cylinder head and rotates in cooperation with the rotation of the second cam shaft; a first intake and exhaust adjusting unit which is installed at the first intake and exhaust manifold for thereby selectively adjusting either an intake of a mixed fuel or air or an exhaust of combustion gas; a second intake and exhaust adjusting unit which is installed at the second intake and exhaust manifold for thereby selectively adjusting either an intake of a mixed fuel or air or an exhaust of a combustion gas; and an exhaust connection pipe which communicates with the first intake and exhaust manifold and the second intake and exhaust manifold, respectively, and forms an exhaust passage of a combustion gas.

According to a preferred embodiment of the present invention, the first cam shaft and the second cam shaft rotate in cooperation with the rotation of the crank shaft with the aid of a first motor unit comprising a first sprocket fixed at the crank shaft, a second sprocket fixed at the first cam shaft, a third sprocket fixed at the second cam shaft, and a motor chain connecting the first through third sprockets.

According to a preferred embodiment of the present invention, the first cam shaft and the second cam shaft rotate one rotation per two rotations of the crank shaft in cooperation with the rotation of the crank shaft as the second and third sprockets rotate one rotation per two rotations of the first sprocket.

According to a preferred subject feature of the present invention, the third cam shaft rotates in cooperation with the rotation of the second cam shaft with aid of a second motor unit comprising a first gear fixed at the second cam shaft and a second gear which is fixed at the third cam shaft and is engaged with the first gear.

According to a preferred subject feature of the present invention, as the second gear rotates one rotation per one rotation of the first gear, the third cam shaft rotates one rotation per one rotation of the second cam shaft in cooperation with the rotation of the second cam by means of the second motor unit.

According to a preferred subject feature of the present invention, the intake and exhaust adjusting unit comprises a communication pipe for selectively communicating the intake and exhaust manifold and the exhaust connection pipe depending on the rotation direction, with both the ends of the communication pipe being closely supported by an inner surface of the exhaust connection pipe, and an actuator for rotating the communication pipe in a radius direction of the exhaust connection pipe.

According to a preferred subject feature of the present invention, the actuator comprises a rotary shaft fixed passing through an intermediate portion of an outer surface of the communication pipe, a spur gear fixed at the rotary shaft, an intake and exhaust adjusting rod which is elastically biased and linearly moves depending on the rotation of the third cam shaft, with an end of the intake and exhaust adjusting rod being in contact with the intake and exhaust adjusting cam which is inserted into the third cam shaft, and a rack gear which is integrally formed at the other end of the intake and exhaust adjusting rod and is engaged with the spur gear.

According to a preferred subject feature of the present invention, a curved plate-shaped skirt is integral with the communication pipe at both the ends of the communication pipe, and the skirt is closely contacted and supported by an inner surface of the exhaust connection pipe.

According to a preferred subject feature of the present invention, a cam protrusion is protruded from one side of an inner surface of the intake and exhaust adjusting cam, and a shoulder corresponding to the cam protrusion is formed at an outer surface of the third cam shaft in a circumferential direction, and the intake and exhaust adjusting cam rotates in cooperation with the rotation of the third cam shaft.

According to a preferred subject feature of the present invention, an empty space is formed at a certain angled portion between the cam protrusion and the shoulder, so the intake and exhaust adjusting cam can freely rotate on the third cam shaft as much as the above angled range at which the empty space is formed.

According to a preferred subject feature of the present invention, at least one of the first intake and exhaust cam, the second intake and exhaust cam and the intake and exhaust adjusting cam is shaped in a hand fan shape.

Advantageous Effects

In the intake and exhaust device of a 4-stroke internal combustion engine according to the present invention, an intake manifold and an exhaust manifold operate as an intake port and an intake valve and an exhaust valve are open during the intake stroke, the negative pressure in the cylinder during the intake stroke reduces for thereby enhancing the inertia rotation force of the crank shaft as much as the reduced pressure, and the intake density of air or mixed fuel can be enhanced by improving the intake efficiency.

In addition, the intake manifold and the exhaust manifold operate as an exhaust port and both the intake value and exhaust value are open during the exhaust stroke, so the exhaust pressure reduces during the exhaust stroke for thereby enhancing the inertia rotation force of the crank shaft as much as the reduced pressure, and it is possible to substantially reduce the noise which has occurred when a high temperature and pressure combustion gas is discharged through the exhaust manifold in the conventional art.

Furthermore, the intake and exhaust device of a 4-stroke internal combustion engine according to the present invention has a simple mechanical mechanism which is inherently designed to operate in cooperation with the crank shaft, so the reliability of the engine is significantly enhanced.

BRIEF DESCRIPTION OF THE DRAWINGS

The present invention will become better understood with reference to the accompanying drawings which are given only by way of illustration and thus are not limitative of the present invention, wherein;

FIGS. 3 and 4 are perspective views illustrating a first motor unit and an exhaust connection pipe according to an embodiment of the present invention;

MODES FOR CARRYING OUT THE INVENTION

The preferred embodiments of the present invention will be described with reference to the accompanying drawings.

Figure 1:
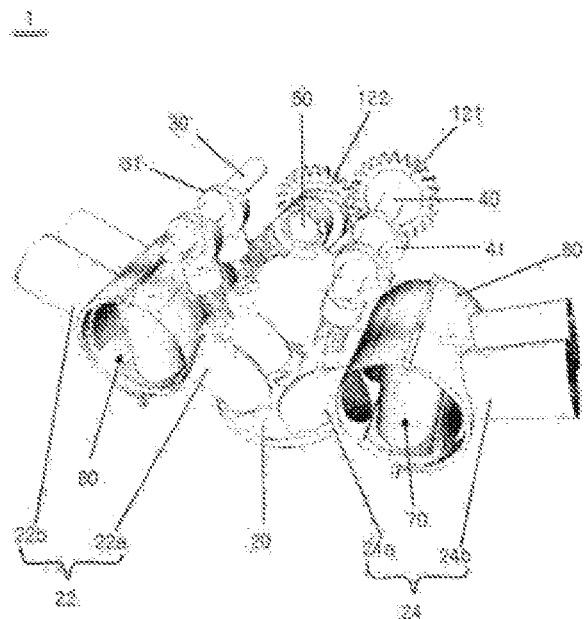
FIG. 1 is a perspective view illustrating an intake and exhaust device of a 4-stroke internal combustion engine according to an embodiment of the present invention.
Figure 2:
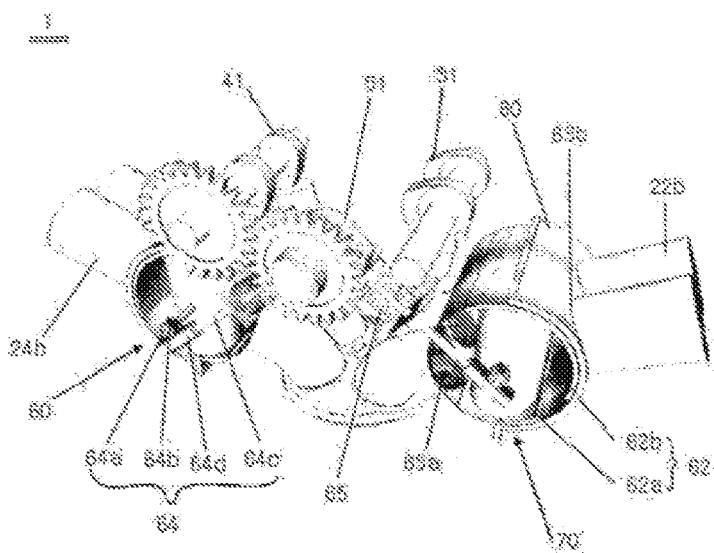
FIG. 2 is a perspective view when seeing the device in the back side in FIG. 1.
Figure 5:
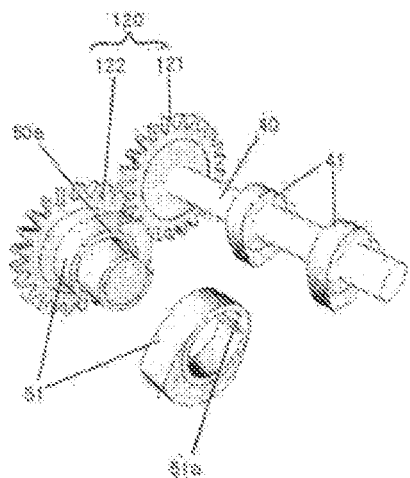
FIGS. 5 and 6 are perspective views illustrating a second motor unit and an intake and exhaust adjusting cam according to an embodiment of the present invention.
Figure 6:
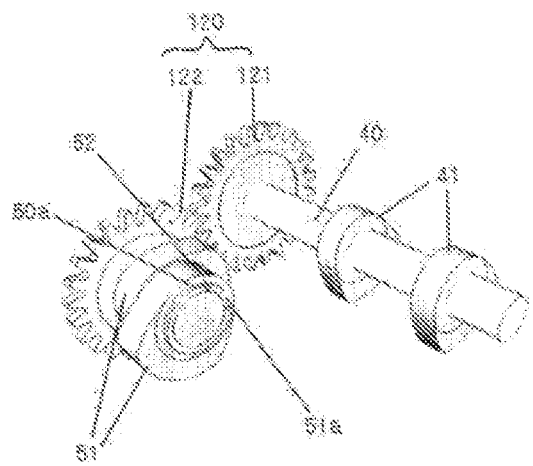
Figure 7:
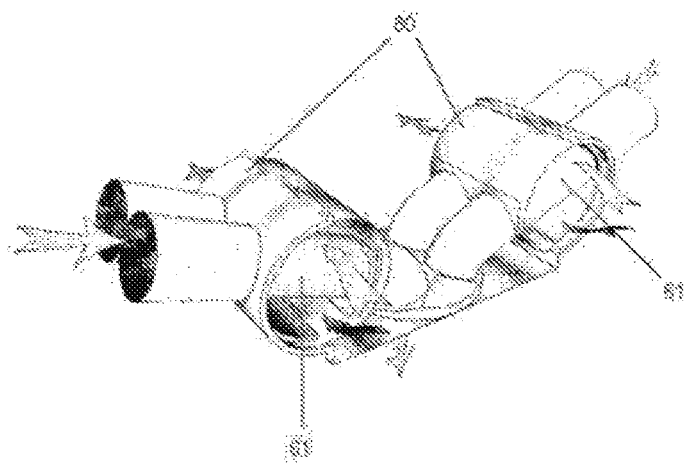
FIGS. 7 and 8 are views illustrating the operation states of a first intake and exhaust adjusting unit and a second intake and exhaust adjusting unit according to an embodiment of the present invention.
Figure 8:
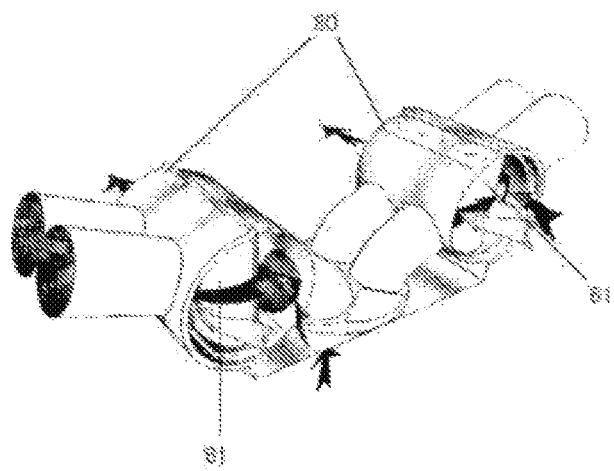

FIG. 1 is a perspective view illustrating an intake and exhaust device of a 4-stroke internal combustion engine according to an embodiment of the present invention, FIG. 2 is a perspective view when seeing the device in the back side in FIG. 1, FIGS. 3 and 4 are perspective views illustrating a first motor unit and an exhaust connection pipe according to an embodiment of the present invention, FIGS. 5 and 6 are perspective views illustrating a second motor unit and an intake and exhaust adjusting cam according to an embodiment of the present invention, FIGS. 7 and 8 are views illustrating the operation states of a first intake and exhaust adjusting unit and a second intake and exhaust adjusting unit according to an embodiment of the present invention, and FIGS. 9 through 16 are views illustrating the strokes of a 4-stroke internal combustion engine equipped with an intake and exhaust device according to an embodiment of the present invention.

As shown in FIGS. 1 through 16, the intake and exhaust device 1 of a 4-stroke internal combustion engine according to the present invention comprises a cylinder block 10 for generating a rotational driving force in cooperation with the rotation of a crank shaft 14 as an up and down reciprocating movement of a piston 11 is transferred thereto with the aid of a connecting rod 12, a cylinder head 20 which is engaged to an upper side of the cylinder block 10, with a first intake manifold 22 opened and closed by means of a first intake and exhaust valve 21 being connected to one side of the cylinder head 20, with a second intake and exhaust manifold 24 opened and closed by means of a second intake and exhaust valve 23 being connected to the other side of the cylinder head 20, a first cam shaft which is installed at an upper side of the cylinder head 20 and rotates in cooperation with the rotation of the crank shaft 14 with a first intake and exhaust cam 31, which drives the first intake and exhaust valve 21, being engaged to the first cam shaft 30, a second camp shaft 40 which is installed at an upper side of the cylinder 20 and rotates in cooperation with the rotation of the crank shaft 14 with a second intake and exhaust cam 41, which drives a second intake and exhaust valve 23, being engaged to the second cam shaft 40, a third cam shaft 50 which is installed at an upper side of the cylinder head 20 and rotates in cooperation with the rotation of the second cam shaft 40, a first intake and exhaust adjusting unit 60 which is installed at the first intake and exhaust manifold for thereby selectively adjusting either an intake of a mixed fuel or air or an exhaust of combustion gas, a second intake and exhaust adjusting unit 70 which is installed at the second intake and exhaust manifold 24 for thereby selectively adjusting either an intake of a mixed fuel or air or an exhaust of a combustion gas, and an exhaust connection pipe 80 which communicates with the first intake and exhaust manifold 22 and the second intake and exhaust manifold 24, respectively, and forms an exhaust passage of a combustion gas.

Here the cylinder block 10 forms a fuel combustion space and guides an up and down reciprocation movement of the piston 11. The piston 11 reciprocates up and down in the interior of the cylinder block 10, and one end of the connecting rod 12 is connected to a lower end of the piston 11. One side of a crank 13 is connected to the other end of the connecting rod 12. The crank shaft 14, which is drivingly connected to the cylinder block 10, is integrally connected to the center of the crank 13, so an up and down reciprocating movement of the piston 11 is transferred to the connecting rod 12 for thereby rotating the crank shaft 14 while generating a rotational force.

The cylinder head 20 is engaged to an upper side of the cylinder block 10. The cylinder head 20 airtightly closes the upper side of the cylinder block 10 and supplies a mixed fuel or air for the combustion of fuel and exhausts combustion gas, with a first intake and exhaust manifold 22 being connected with one side of the cylinder head 20 for being opened or closed by means of the first intake and exhaust valve 21 and sucking a mixed fuel or air into the cylinder block 10 or exhausting a combustion gas to the outside of the cylinder block 10, with a second intake and exhaust manifold 24 being connected with the other side of the cylinder head 20 for being opened and closed by means of a second intake and exhaust valve 23 and sucking a mixed fuel or air into the cylinder block 10 or exhausting a combustion gas to the outside of the cylinder block 10, with an ignition plug (not shown) being connected to a center portion of the cylinder head 20 for sparking and igniting when the mixed fuel sucked into the interior is compressed (in case of gasoline engine) or with a fuel spraying port (not shown) being connected thereto for spraying fuel and generating explosions when the air sucked into the interior is compressed (in case of diesel engine).

In the conventional art, the intake manifold and the exhaust manifold are separately configured, so they are used for only their own exclusive uses such as an intake of air or mixed fuel or an exhaust of combustion gas. However, the first and second intake and exhaust manifolds 22 and 24 according to the present invention are designed for the joint purposes of intake and exhaust operations. In the intake stroke, the intake operation of air or mixed fuel can be performed via the first and second intake and exhaust manifolds 22 and 24. In the exhaust stroke, the exhaust of a combustion gas is performed via the first and second exhaust manifolds 22 and 24.

At this time, it is preferred that the first intake and exhaust manifold 22 and the second intake and exhaust manifold 24 are installed neighbored with each other in a pair in order to enhance the intake and exhaust efficiencies. As shown in FIGS. 1 and 2, the first intake and exhaust valve 21 and the second intake and exhaust value 23 are installed in a pair, and the first intake and exhaust cam 31 and the second intake and exhaust cam 41 are installed in a pair.

The first cam shaft 30 is disposed at an upper side of the cylinder head 20, with the first cam 30 rotating in cooperation with the rotation of the crank shaft 14. The first intake and exhaust cam 31 is engaged to the first cam shaft 30 for pushing the first intake and exhaust valve 21 and opening the first intake and exhaust manifold 22 while rotating integrally together with the first cam shaft 30, so that the intake stroke of a mixed fuel or air or the exhaust stroke of a combustion gas occurs.

The second cam shaft 40 is disposed, running parallel with the first cam shaft 30, at an upper side of the cylinder head 20, while rotating in cooperation with the rotation of the crank shaft 14. A second intake and exhaust cam 41 is engaged to the second cam shaft 40 for pushing the second intake and exhaust valve 23 and opening the second intake and exhaust manifold 24 while rotating integrally with the crank shaft 14, so that the intake stroke of a mixed fuel or air or the exhaust stroke of a combustion gas occurs.

The first cam shaft 30 and the second cam shaft 40 rotate in cooperation with the rotation of the crank shaft 14 by means of the first motor unit 110. As shown in FIGS. 3 and 4, the first motor unit 110 comprises a first sprocket 111 fixed at the crank shaft 14, a second sprocket 112 fixed at the first cam shaft 30, a third sprocket 113 fixed at the second cam shaft 40, and a motored chain 114 for drivingly connecting the sprockets 111 through 113.

Here, the first cam shaft 30 rotates one rotation in cooperation with the rotation of the crank shaft 14 when the crank shaft 14 rotates twice as the second sprocket 112 rotates one rotation per two rotations of the first sprocket 111 so that the intake stroke of a mixed fuel or air and the exhaust stroke of a combustion gas occurs one time at a 4-stroke interval during the entire 4-stroke process which is performed in cooperation with the two rotations of the crank shaft 14.

The second cam shaft 40 rotates one rotation per two rotations of the crank shaft 14 in cooperation with the rotation of the crank shaft 14 as the third sprocket 113 rotates one rotation per two rotations of the first sprocket 111 so that the intake stroke of a mixed fuel or air and the exhaust stroke of a combustion gas occurs one time at a 4-stroke interval during the entire 4-stroke process which is performed in cooperation with the two rotations of the crank shaft 14.

Therefore, when the first intake and exhaust valve 21 is opened by means of the first intake and exhaust cam 31, and the intake stroke of a mixed fuel or air occurs, the second intake and exhaust valve 23 is opened by means of the second intake and exhaust cam 41, so that the intake stroke of a mixed fuel or air is performed. Thereafter, the first intake and exhaust valve 21 is opened by means of the first intake and exhaust cam 31 at an interval of 3-stroke, and when the exhaust stroke of a combustion gas occurs, the second intake and exhaust valve 23 is opened by means of the second intake and exhaust cam 41, so the exhaust stroke of a combustion gas is performed.

At this time, following the exhaust stroke, the intake stroke of a mixed fuel or air is performed by means of the first and second intake and exhaust cams 31 and 41. Here, it is preferred that the robes of the first and second intake and exhaust cams 31 and 41 are formed in conical shapes having certain angles for keeping the first and second intake and exhaust valves 21 and 23 open by pushing the ends of the first and second intake and exhaust valves 21 and 23 during the intake and exhaust strokes.

The arrows in FIGS. 3 and 4 mean that cold air is introduced via the exhaust connection pipe 80 and is discharged from the exhaust connection pipe 80.

The third cam shaft 50 is installed at an upper side of the cylinder head 20. The third cam shaft 50 rotates in cooperation with the rotation of the second cam shaft 40 and controls the operations of the first intake and exhaust adjusting unit 60 and the second intake and exhaust adjusting unit 70 which will be described later. The first and second intake and exhaust adjusting units 60 and 70 operate by means of a pair of the intake and exhaust adjusting cams 51 each engaged to the third cam shaft 50 for thereby selecting the intake of air or a mixed fuel or an exhaust of a combustion gas.

Here it is preferred that the third cam shaft 50 disposed between the first cam shaft 30 and the second cam shaft 40 is installed eccentrically in one direction from the center of the cylinder head 20, so that an ignition plug or a fuel spraying unit can be installed at the center of the cylinder head 20.

The third cam shaft 50 rotates in cooperation with the rotation of the second cam shaft 40 with the aid of the second motor unit 120, and as shown in FIGS. 5 and 6, the second motor unit 120 comprises a first gear 121 fixed to the second cam shaft 40, and a second gear 122 which is fixed to the third cam shaft 50 and is engaged with the first gear 121.

The third cam shaft 50 rotates one rotation per one rotation of the second cam shaft 40 in cooperation with the rotation of the second cam shaft 40 with the aid of the second motor unit 120 as the second gear 122 rotates one rotation per one rotation of the first gear 121 based on the gear ratio 1:1 between the first and second gears 121 and 122 so that the first and second intake and exhaust adjusting units 60 and 70 can rotate one rotation wherein the third cam shaft 50 rotates one rotation during the entire 4-stroke depending on the two rotations of the crank shaft 14.

The first and second intake and exhaust manifolds 22 and 24 are installed passing through the exhaust connection pipe 80. The exhaust connection pipe 80 are passages through which the mixed fuel or air sucked into the cylinder block 10 via the first and second intake and exhaust manifolds 22 and 24 can be exhausted as combustion gas via the compression stroke and the explosion stroke. As shown in FIGS. 1, 7 and 8, one end of the exhaust connection pipe 80 communicates with the ends 22a, 24a of the first and second intake and exhaust manifolds with the aid of a first communication hole 63a, and the other end of the exhaust connection pipe 80 communicates with the other ends 22b, 24b of the first and second intake and exhaust manifolds with the aid of a second communication hole 63b, and the one ends 22a, 24a and the other ends 22b, 24b of the first and second intake and exhaust manifolds are connected via a communication pipe 61 in the exhaust connection pipe 80, respectively.

The first and second intake and exhaust adjusting units 60 and 70 are installed at the portions in which the first and second intake and exhaust manifolds 22 and 24 are connected to the exhaust connection pipe 80. The first and second intake and exhaust adjusting units 60 and 70 are configured so that as the passages are selectively changed from the first and second intake and exhaust manifolds 22 and 4 to the exhaust connection pipe 80, as shown in FIG. 7, the ends 22a, 24a of the first and second intake and exhaust manifolds become communicated with the other ends 22b, 24b so that mixed fuel or air can be sucked into the cylinder block 10 during the intake stroke, and as shown in FIG. 8, a combustion gas is exhausted through the exhaust connection pipe 80 as the communication pipe 61 becomes communicated with the ends 22a, 24a of the first and second intake and exhaust manifolds and the exhaust connection pipe 80. The first and second intake and exhaust adjusting unit 60, 70 comprises a communication pipe 61, and an actuator 64 for rotating the communication pipe 61.

Here, the exhaust connection pipe 80 functions as a support for helping the communication pipe 61 rotate, and exhaust gas is sucked by means of an exhaust fan (not shown) connected to the crank shaft 14 driven with the aid of a driving belt 200 at an end of the exhaust connection pipe 80. The communication pipe 61 can be cooled by means of cold air sucked from the outside. Since the exhaust fan continues to rotate as long as the crank shaft 14 rotates, the communication pipe 61 is cooled continuously for thereby preventing the intake efficiency from decreasing in the present invention, which efficiency decrease used to occur by means of a temperature increase of air or mixed fuel sucked via the first and second intake and exhaust manifolds 22 and 24.

A reliable sealing is very important during the operations of the first and second intake and exhaust adjusting units 60 and 70. So, it is preferred that the communication pipe 61 is needed to rotate, with both the ends of the communication pipe 61 closely contacting with both the inner sides of the exhaust connection pipe 80. So, the communication pipe 61 is equipped with a curved plate-shaped skirt 62 which is integrally formed at both the ends of the communication pipe 61 along with the communication pipe 61 and closely contacts with an inner surface of the exhaust connection pipe 80.

Figure 14:
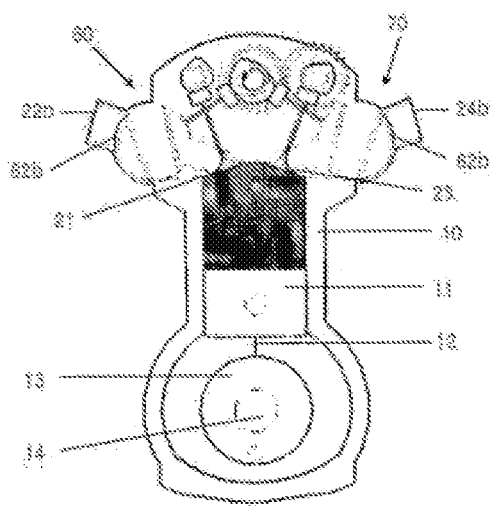
Figure 15:
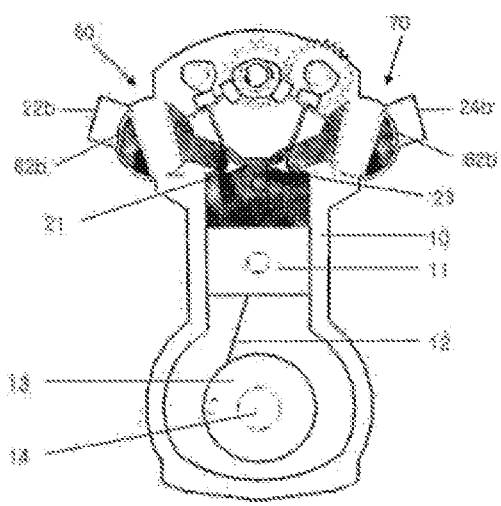
Figure 16:
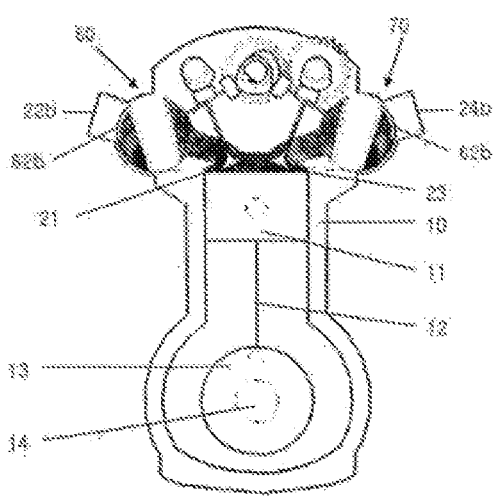

As shown in FIGS. 14 through 16, a first communication hole 63a is open during the exhaust stroke when the communication pipe 61 rotates, and in case that the first and second intake and exhaust manifolds 22 and 24 get communicated with the exhaust connection pipe 80, a second communication hole 63b keeps closed so that an exhaust gas can be discharged through the exhaust connection pipe 80.

Even when the first communication hole 63a is open when the communication pipe 61 rotates, it is preferred for the skirt 62b to have a certain length at the side of both the ends 22b and 24b of the first and second intake and exhaust manifolds so that a proper closed state can be maintained by means of the skirt 62 at the side of the other ends 22b and 24b of the first and second intake and exhaust manifolds, and it is preferred for the length of the chord of the skirt 62b at the side of the other ends 22b and 24b of the first and second intake and exhaust manifolds to be the same as a bit longer than the diameter of the second communication hole 63b.

As shown in FIG. 2, the actuator 64, which rotates the communication pipe 61 in both directions, comprises a rotary shaft 64a passing through an intermediate portion of an outer surface of the communication pipe 61 and being fixed, a spur gear 64b fixedly engaged to the rotary shaft 64a, an intake and exhaust adjusting rod 64c which is elastically biased by means of a coil spring 65 and linearly moves depending on the rotation of the third cam shaft 50, with one end of the intake and exhaust adjusting rod 64c contacting with a pair of the intake and exhaust adjusting cams 51, respectively, engaged to the third cam shaft 50, and a rack gear 64d which is integrally formed at the other end of the intake and exhaust adjusting rod 64c and is engaged with the spur gear 64b.

Therefore, when the third cam 50 rotates, the intake and exhaust adjusting cam 51 engaged to the third cam shaft 50 rotates, and when the intake and exhaust adjusting rod 64c closely contacting with the intake and exhaust adjusting cam 51 linearly moves, the rack gear 64d formed at its end linearly moves. When the spur gear 64d fixed to the rotary shaft 64a of the communication pipe 61 rotates alternately changing its rotation direction in both directions with the aid of the linear movement of the rack gear 64d, the communication pipe 61 rotates in the exhaust connection pipe 80. The one ends 22a and 24a and the other ends 22b and 24b of the first and second intake and exhaust manifolds get communicated, so a mixed fuel or air is sucked into the cylinder block 10 during the intake stroke, and the one ends 22a and 24a of the first and second intake and exhaust manifolds get communicated with the exhaust connection pipe 80, respectively, whereby a combustion gas is discharged via the exhaust connection pipe 80 during the exhaust stroke.

In the operation of the intake and exhaust adjusting cam 51, the first and second intake and exhaust manifolds 22 and 24 and the exhaust connection pipe 80 maintain communicated with each other with the aid of the first and second intake and exhaust adjusting units 60 and 70 during the exhaust stroke, and after the exhaust stroke is finished, the communication pipe 61 is quickly rotated just before the intake stroke, so the one ends 22a and 24a and the other ends 22b and 24b of the first and second intake and exhaust manifolds get communicated, whereby air or a mixed fuel is sucked into the cylinder 10 via the first and second intake and exhaust manifolds 22 and 24.

As shown in FIGS. 5 and 6, a cam protrusion 51a is protruded from one side of an inner surface of the intake and exhaust adjusting cam 51 into which a third cam shaft 50 is inserted, and a shoulder 50a corresponding to the cam protrusion 51a is formed at an outer surface of the third cam shaft 50 in a circumferential direction. When the third cam shaft 50 rotates, the shoulder 50a of the third cam shaft 50 pushes the cam protrusion 51a, so the intake and exhaust adjusting cam 51 rotates in cooperation with the rotation of the third cam shaft 50. An empty space 52 is formed at a certain angled portion of the shoulder 50a formed in a circumferential direction, the intake and exhaust adjusting cam 51 can freely rotate irrespective of the rotation of the third cam shaft 50 within a certain interval of the angled portion.

In addition, it is preferred that a robe of the intake and exhaust adjusting cam 51, which transfers an operational force while being in contact with an upper side of the intake and exhaust adjusting rod 64c in a hand fan shape with a certain angle, so the communication between the first and second intake and exhaust manifolds 22 and 24 and the exhaust connection pipe 80 remains longest after the communication pipe 61 rotates, and the operation that the communication pipe 61 rotates so that the one ends 22a and 24a and the other ends 22b and 24b of the first and second intake and exhaust manifolds, can be fast performed.

It is preferred that the intake and exhaust adjusting cam 51 keeps pushing the upper side of the intake and exhaust adjusting rod 64c just before the intake stroke in a state that an enough amount of valve lift is obtained by means of the hand fan-shaped robe and then is quickly rotated by receiving a strong elastic recovery force of the coil spring 65 at the time when the robe of the intake and exhaust adjusting cam 51 is departed from the intake and exhaust adjusting rod 64c, so that the one ends 22a and 24a and the other ends 22b and 24b of the first and second intake and exhaust manifolds get communicated with each other.

The intake and exhaust adjusting cam 51 quickly starts rotating because the cam protrusion 51 quickly rotates as the intake and exhaust adjusting cam 51 operates along an empty space 52 formed between the same and the shoulder 50a of the third cam shaft 50 at a certain angle at the moment when the side surface of the intake and exhaust adjusting cam 51 receives a strong elastic recovery force of the coil spring 65.

The operations of the intake and exhaust device 1 of a 4-stroke internal combustion engine according to an embodiment of the present invention will be described by each stroke.

As shown in FIGS. 9 through 16, the 4-stroke internal combustion engine is configured to generate a driving force while sequentially performing the intake stroke for sucking a mixed fuel or air into the cylinder block 10, the compression stroke for compressing the mixed fuel or air sucked into the cylinder block 10 during the intake stroke as the piston 11 moves up, the explosion stroke for generating an explosive combustion by igniting the mixed fuel compressed during the compression stroke by using an ignition plug or spraying fuel toward the air compressed during the compression stroke, and the exhaust stroke for exhausting the combustion stroke combusted during the explosion stroke from the cylinder block 10.

In the intake and exhaust device 1 of a 4-stroke internal combustion engine according to the present invention, the first and second intake and exhaust valves 21 and 23 maintain open during the exhaust stroke and the intake stroke among the entire 4 strokes and maintain closed during the compression stroke and the explosion stroke.

The first and second intake and exhaust adjusting units 60 and 70 maintain in a state that the communication pipe 61 allows the one ends 22a and 24a of the first and second intake and exhaust manifolds to communicate with the other ends of the same during the entire strokes except for the exhaust stroke among the entire 4 strokes and allows the ends 22a and 24a of the first and second intake and exhaust manifolds to communicate with the exhaust connection pipe 80.

Figure 9:
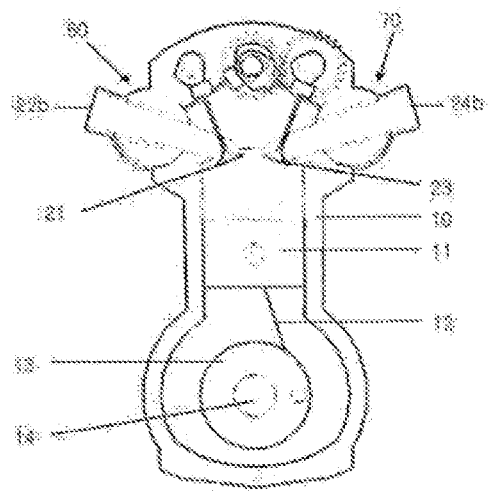
FIGS. 9 through 16 are views illustrating the strokes of a 4-stroke internal combustion engine equipped with an intake and exhaust device according to an embodiment of the present invention.
Figure 10:
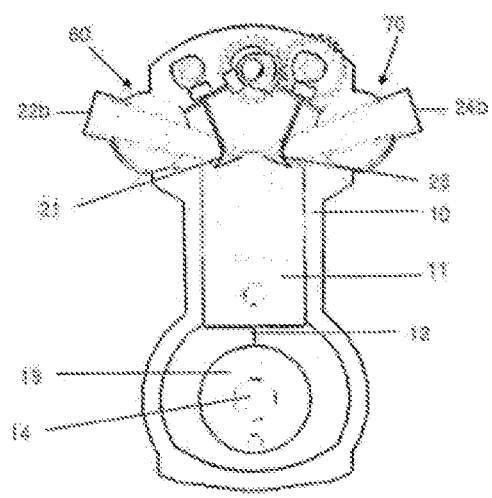

The intake stroke is shown in FIGS. 9 and 10. The crank shaft 14 rotates 0° to 180° during the intake stroke, and the first cam shaft 30 and the second cam shaft 40 operating in cooperation with the crank shaft 14 by means of the first motor unit 110 rotate 0° to 90°, and the third cam shaft 50 operating in cooperation with the second cam shaft 40 by means of the second motor unit 120 rotates 0° to 90°.

The first intake and exhaust cam 31 integrally engaged to the first cam shaft 30 pushes downwardly the first intake and exhaust valve 21 for thereby opening the first intake and exhaust manifold 22 while the crank shaft 14 rotates 0° to 180°, and the second intake and exhaust cam 41 integrally engaged with the second cam shaft 40 downwardly pushes the second intake and exhaust valve 23 for thereby opening the second intake and exhaust manifold 24, so a mixed fuel or air is sucked into the cylinder block 10, and the piston 11 moves from the top dead center to the bottom dead center, and a mixed fuel or air is sucked into the cylinder block 10. When the crank shaft 14 rotates 180° and the piston 11 reaches the bottom dead center, the first and second intake and exhaust valves 21 and 23 return to the original positions, and the first and second intake and exhaust manifolds 22 and 24 are closed, and the intake stroke is completed.

Figure 11:
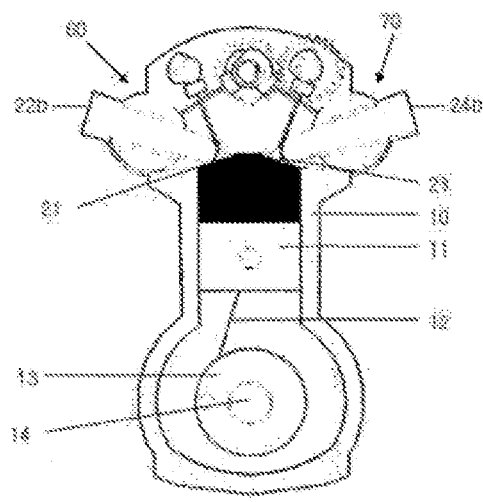
Figure 12:
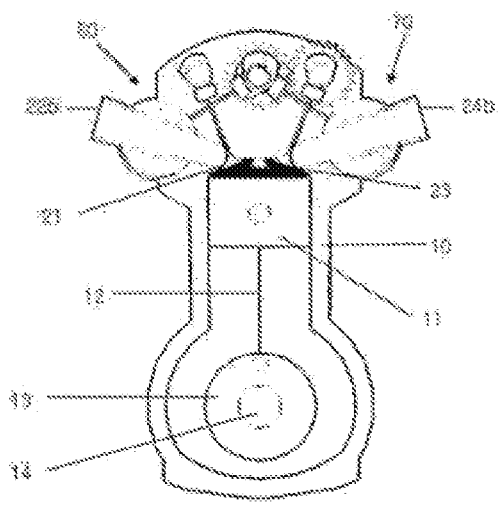

The compression stroke is shown in FIGS. 11 and 12. The crank shaft 14 rotates from 180° to 360° during the compression stroke, and the first cam shaft 30 and the second cam shaft 40 rotating in cooperation with the rank shaft 14 by means of the first motor unit 110 rotate from 90° to 180°, and the third cam shaft 50 rotating in cooperation with the second cam shaft 40 rotates from 90° to 180° by means of the second motor unit 120.

The first and second intake and exhaust valves 21 and 23 remain closed while the crank shaft 140 rotates from 180° to 360°, so the first and second intake and exhaust manifolds 22 and 24 remains closed, and the piston 11 moves from the bottom dead center to the top dead center, whereby the mixed fuel or air sucked into the cylinder block 10 is compressed.

Figure 13:
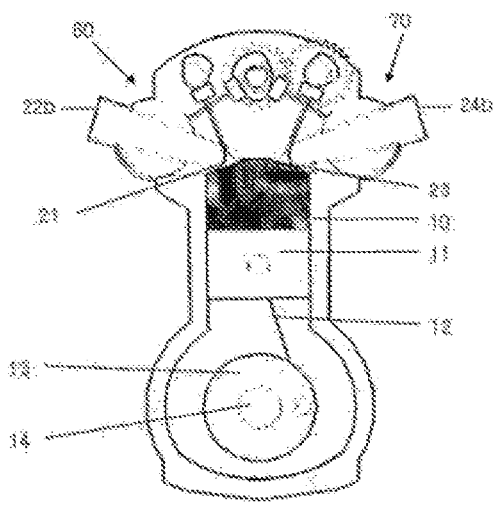

The explosion stroke is shown in FIGS. 13 and 14. The crank shaft 14 rotates from 360° to 540° during the explosions stroke, and the first cam shaft 30 and the second cam shaft 40 rotating in cooperation with the crank shaft 14 by means of the first motor unit 110 rotates from 180° to 270°, and the third cam shaft 50 rotating in cooperation with the second cam shaft 40 by means of the second motor unit 120 rotates from 180° to 270°.

When the crank shaft 14 rotates 360°, an ignitable spark is generated by an ignition plug or a fuel is sprayed by a fuel spraying member. The piston 11 is forced to move down when the compressed mixed fuel or air is explosively combusted, and the exploding force is transferred to the crank 13 via the connecting rod 12 for thereby rotating the crank shaft 14, and the piston 11 moves from the top dead center to the bottom dead center while the crank shaft 14 rotates from 360° to 540°.

The first and second intake and exhaust valves 21 and 23 remains closed while the crank shaft 14 rotates from 360° to 540°, so the first and second intake and exhaust manifolds 22 and 24 remain closed.

The exhaust stroke is shown in FIGS. 15 and 16. The crank shaft 14 rotates from 540° to 720° during the exhaust stroke. The first cam shaft 30 and the second cam shaft 40 rotating in cooperation with the crank shaft 14 by means of the first motor unit 110 rotate from 270° to 360°, and the third cam shaft 50 rotating in cooperation with the second cam shaft 40 rotates from 270° to 360° by means of the second motor unit 120.

The first intake and exhaust cam 31 and the second intake and exhaust cam 41 push downwardly the first intake and exhaust valve 21 and the second intake and exhaust valve 23 while the crank shaft 14 rotates from 540° to 720°, so the first and second intake and exhaust manifolds 22 and 24 are opened, whereby a combustion gas is discharged from the cylinder block 10, and the piston 11 moves from the bottom dead center to the top dead center for thereby pushing and discharging combustion gas.

When the intake and exhaust adjusting rod 64c linearly moves by means of a pair of the intake and exhaust adjusting cams 51 engaged to the third cam shaft 50 during the exhaust stroke, the communication pipe 61 rotates, and as a result, the communication pipe 61 allows the one ends 22a and 24a of the first and second intake an exhaust manifolds to communicate with the exhaust connection pipe 80 by means of the first communication hole 63a. At this time, the second communication hole maintains closed by means of the skirt 62b.

The combustion gas exhausted from the cylinder block 10 during the exhaust stroke is not exhausted via the other ends 22b and 24b of the first and second intake and exhaust manifolds, but is exhausted via the exhaust connection pipe 80. At this time, an exhaust fan (not shown) is installed at one side of the exhaust connection pipe 80 so that is can rotate in cooperation with the crank shaft 14 by means of a fan driving belt 200, so the combustion gas can be discharged to the outside via the exhaust connection pipe 80 by means of the rotation of the exhaust fan.

A high temperature and pressure combustion gas is fast discharged via the exhaust manifolds with significantly reduced noise as compared to the conventional art.

When the crank shaft 14 rotates 720°, the intake and exhaust adjusting rod 64c returns to its original position, and the communication pipe 61 rotates, and the one ends 22a and 24a and the other ends 22b and 24b of the first and second intake and exhaust manifolds get communicated with each other, so the exhaust stroke is finished.

When the robe of the intake and exhaust adjusting cam 51 departs from an upper side of the intake and exhaust adjusting rod 64c while the intake and exhaust adjusting cam 51 keeps rotating, the intake and exhaust adjusting cam 51 starts quickly rotating by receiving a strong elastic recovery force of the coil spring 65, and the intake and exhaust adjusting rod 64c starts quickly linearly moving, and the communication pipe 61 starts quickly rotating, so the one ends 22a and 24a and the other ends 22b and 24b of the first and second intake and exhaust manifolds become communicated with each other.

At this time, the quick rotation of the intake and exhaust adjusting cam 51 is performed as the cam protrusion 51a starts quickly rotating along the empty space 52 formed between the same and the shoulder 50a of the third cam shaft 50 at the moment when one side of the intake and exhaust adjusting cam 51 receives a strong elastic recovery force of the coil spring 65.

The hand fan-shaped robes of the first and second intake and exhaust cams 31 and 41 continue to push the first and second intake and exhaust valves 21 and 23 from the exhaust stroke to the intake stroke, so the first and second intake and exhaust valves 21 and 23 remain opened until the strokes from the exhaust stroke to the intake stroke are finished.

A mixed fuel or air is sucked into the cylinder block in a state that the one ends 22a and 24a and the other ends 22b and 24b of the first and second intake and exhaust manifolds are communicated during the intake stroke, and a combustion gas is exhausted via the one ends 22a and 24a and the exhaust connection pipe 80 of the first and second intake and exhaust manifolds during the exhaust stroke.

INDUSTRIAL APPLICABILITY

When the intake and exhaust device of a 4-stroke internal combustion engine according to the present invention is applied to an internal combustion engine including a vehicle, the negative pressure in the cylinder is reduced during the intake stroke by allowing the conventional intake and exhaust manifolds to operate as an intake port and opening both the intake valve and exhaust valve, and an inertia rotational force of the crank shaft is preserved, and the intake density of a mixed fuel or air is enhanced by improving the intake efficiency. In addition, the negative pressure of the cylinder is reduced during the exhaust stroke by allowing the conventional intake and exhaust manifolds to operate as an exhaust port and opening both the intake valve and exhaust valve, and an inertia rotational force of the crank shaft is preserved, and the intake density of a mixed fuel or air is enhanced by improving the intake efficiency. It is possible to reduce the noise occurring when a high temperature and pressure is discharged via the exhaust manifold in the conventional art, and the present invention is implemented by a relatively simple mechanical configuration which operates in cooperation with the rotation of the crank shaft, so the reliability can be enhanced.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. An intake and exhaust device of a 4-stroke internal combustion engine, comprising:
   a cylinder block for generating a rotational driving force in cooperation with the rotation of a crank shaft as an up and down reciprocating movement of a piston is transferred thereto with the aid of a connecting rod;
   a cylinder head which is engaged to an upper side of the cylinder block, with a first intake manifold opened and closed by means of a first intake and exhaust valve being connected to one side of the cylinder head, with a second intake and exhaust manifold opened and closed by means of a second intake and exhaust valve being connected to the other side of the cylinder head;
   a first cam shaft which is installed at an upper side of the cylinder head and rotates in cooperation with the rotation of the crank shaft with a first intake and exhaust cam, which drives the first intake and exhaust valve, being engaged to the first cam shaft;

a second camp shaft which is installed at an upper side of the cylinder and rotates in cooperation with the rotation of the crank shaft with a second intake and exhaust cam, which drives a second intake and exhaust valve, being engaged to the second cam shaft;

a third cam shaft which is installed at an upper side of the cylinder head and rotates in cooperation with the rotation of the second cam shaft;

a first intake and exhaust adjusting means which is installed at the first intake and exhaust manifold for thereby selectively adjusting either an intake of a mixed fuel or air or an exhaust of combustion gas;

a second intake and exhaust adjusting means which is installed at the second intake and exhaust manifold for thereby selectively adjusting either an intake of a mixed fuel or air or an exhaust of a combustion gas; and an exhaust connection pipe which communicates with the first intake and exhaust manifold and the second intake and exhaust manifold, respectively, and forms an exhaust passage of a combustion gas.

2. An intake and exhaust device of a 4-stroke internal combustion engine according to claim 1, wherein said first cam shaft and said second cam shaft rotate in cooperation with the rotation of the crank shaft with the aid of a first motor means comprising a first sprocket fixed at the crank shaft, a second sprocket fixed at the first cam shaft, a third sprocket fixed at the second cam shaft, and a motor chain connecting the first through third sprockets.

3. An intake and exhaust device of a 4-stroke internal combustion engine according to claim 2, wherein said first cam shaft and said second cam shaft rotate one rotation per two rotations of the crank shaft in cooperation with the rotation of the crank shaft as the second and third sprockets rotate one rotation per two rotations of the first sprocket.

4. An intake and exhaust device of a 4-stroke internal combustion engine according to claim 1, wherein said third cam shaft rotates in cooperation with the rotation of the second cam shaft with aid of a second motor means comprising a first gear fixed at the second cam shaft and a second gear which is fixed at the third cam shaft and is engaged with the first gear.

5. An intake and exhaust device of a 4-stroke internal combustion engine according to claim 4, wherein as said second gear rotates one rotation per one rotation of the first gear, said third cam shaft rotates one rotation per one rotation of the second cam shaft in cooperation with the rotation of the second cam by means of the second motor means.

6. An intake and exhaust device of a 4-stroke internal combustion engine according to claim 1, wherein said intake and exhaust adjusting means comprises a communication pipe for selectively communicating the intake and exhaust manifold and the exhaust connection pipe depending on the rotation direction, with both the ends of the communication pipe being closely supported by an inner surface of the exhaust connection pipe, and an actuator for rotating the communication pipe in a radius direction of the exhaust connection pipe.

7. An intake and exhaust device of a 4-stroke internal combustion engine according to claim 6, wherein said actuator comprises a rotary shaft fixed passing through an intermediate portion of an outer surface of the communication pipe, a spur gear fixed at the rotary shaft, an intake and exhaust adjusting rod which is elastically biased and linearly moves depending on the rotation of the third cam shaft, with an end of the intake and exhaust adjusting rod being in contact with the intake and exhaust adjusting cam which is inserted into the third cam shaft, and a rack gear which is integrally formed at the other end of the intake and exhaust adjusting rod and is engaged with the spur gear.

8. An intake and exhaust device of a 4-stroke internal combustion engine according to claim 6, wherein a curved plate-shaped skirt is integral with the communication pipe at both the ends of the communication pipe, and said skirt is closely contacted and supported by an inner surface of the exhaust connection pipe.

9. An intake and exhaust device of a 4-stroke internal combustion engine according to claim 7, wherein a cam protrusion is protruded from one side of an inner surface of the intake and exhaust adjusting cam, and a shoulder corresponding to the cam protrusion is formed at an outer surface of the third cam shaft in a circumferential direction, and said intake and exhaust adjusting cam rotates in cooperation with the rotation of the third cam shaft.

10. An intake and exhaust device of a 4-stroke internal combustion engine according to claim 9, wherein an empty space is formed at a certain angled portion between the cam protrusion and the shoulder, so the intake and exhaust adjusting cam can freely rotate on the third cam shaft as much as the above angled range at which the empty space is formed.

11. An intake and exhaust device of a 4-stroke internal combustion engine according to claim 1, at least one of the first intake and exhaust cam, the second intake and exhaust cam and the intake and exhaust adjusting cam is shaped in a hand fan shape.

12. An intake and exhaust device of a 4-stroke internal combustion engine according to claim 2, at least one of the first intake and exhaust cam, the second intake and exhaust cam and the intake and exhaust adjusting cam is shaped in a hand fan shape.

13. An intake and exhaust device of a 4-stroke internal combustion engine according to claim 3, at least one of the first intake and exhaust cam, the second intake and exhaust cam and the intake and exhaust adjusting cam is shaped in a hand fan shape.

14. An intake and exhaust device of a 4-stroke internal combustion engine according to claim 4, at least one of the first intake and exhaust cam, the second intake and exhaust cam and the intake and exhaust adjusting cam is shaped in a hand fan shape.

15. An intake and exhaust device of a 4-stroke internal combustion engine according to claim 5, at least one of the first intake and exhaust cam, the second intake and exhaust cam and the intake and exhaust adjusting cam is shaped in a hand fan shape.

16. An intake and exhaust device of a 4-stroke internal combustion engine according to claim 6, at least one of the first intake and exhaust cam, the second intake and exhaust cam and the intake and exhaust adjusting cam is shaped in a hand fan shape.

17. An intake and exhaust device of a 4-stroke internal combustion engine according to claim 7, at least one of the first intake and exhaust cam, the second intake and exhaust cam and the intake and exhaust adjusting cam is shaped in a hand fan shape.

18. An intake and exhaust device of a 4-stroke internal combustion engine according to claim 8, at least one of the first intake and exhaust cam, the second intake and exhaust cam and the intake and exhaust adjusting cam is shaped in a hand fan shape.

19. An intake and exhaust device of a 4-stroke internal combustion engine according to claim 9, at least one of the first intake and exhaust cam, the second intake and exhaust cam and the intake and exhaust adjusting cam is shaped in a hand fan shape.

20. An intake and exhaust device of a 4-stroke internal combustion engine according to claim 10, at least one of the first intake and exhaust cam, the second intake and exhaust cam and the intake and exhaust adjusting cam is shaped in a hand fan shape.

* * * * *